United States Patent
Teskey (10) Patent No.: US 7,873,977 B2
(45) Date of Patent: Jan. 18, 2011

(54) METHOD FOR CONTROLLING A MULTI-TUNER SIGNAL RECEIVING APPARATUS

(75) Inventor: John Frederick Teskey, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 749 days.

(21) Appl. No.: 11/579,075

(22) PCT Filed: Apr. 21, 2005

(86) PCT No.: PCT/US2005/013801

§ 371 (c)(1),
(2), (4) Date: Oct. 30, 2006

(87) PCT Pub. No.: WO2005/115000

PCT Pub. Date: Dec. 1, 2005

(65) Prior Publication Data

US 2007/0220547 A1 Sep. 20, 2007

Related U.S. Application Data

(60) Provisional application No. 60/568,896, filed on May 7, 2004.

(51) Int. Cl.
*H04N 7/18* (2006.01)
*H04N 7/16* (2006.01)

(52) U.S. Cl. .......................................... 725/78; 725/151

(58) Field of Classification Search .................... 725/74, 725/76, 78; 348/114, 211.99, 734
See application file for complete search history.

(56) References Cited

U.S. PATENT DOCUMENTS

| 4,890,108 | A | | 12/1989 | Drori et al. |
| 5,045,948 | A | | 9/1991 | Streck et al. |
| 5,420,647 | A | | 5/1995 | Levine |
| 5,708,961 | A | * | 1/1998 | Hylton et al. ................. 725/81 |
| 5,867,223 | A | * | 2/1999 | Schindler et al. ............ 725/140 |
| 6,097,441 | A | | 8/2000 | Allport |

(Continued)

FOREIGN PATENT DOCUMENTS

CN 2509779 4/2002

(Continued)

OTHER PUBLICATIONS

Patent Abstracts of Japan, vol. 2003, No. 11, Nov. 5, 2003 & JP 2003-219200,( Matsushita Electric Ind.Co. Ltd.).

(Continued)

*Primary Examiner*—Brian T Pendleton
*Assistant Examiner*—Jean D Saint Cyr
(74) *Attorney, Agent, or Firm*—Robert D. Shedd; Joseph J. Opalach; Reitseng Lin (57) ABSTRACT

A multi-tuner signal receiving apparatus enables signal distribution in a household and/or business dwelling, and can be effectively controlled by users via one or more remote control devices. According to an exemplary embodiment, the apparatus includes a plurality of tuners and a controller including a memory for storing association data indicating an association between a remote control device and a first one of the tuners. The controller causes the first tuner to tune to a particular channel responsive to a control signal from the remote control device selecting the particular channel.

34 Claims, 4 Drawing Sheets

U.S. PATENT DOCUMENTS

| | | | |
|---|---|---|---|
| 6,172,702 B1 | 1/2001 | Simon | |
| 6,177,963 B1 | 1/2001 | Foye et al. | |
| 6,407,779 B1 * | 6/2002 | Herz | 725/39 |
| 6,493,876 B1 * | 12/2002 | DeFreese et al. | 725/100 |
| 6,516,467 B1 * | 2/2003 | Schindler et al. | 725/68 |
| 6,622,307 B1 * | 9/2003 | Ho | 725/120 |
| 7,151,575 B1 * | 12/2006 | Landry et al. | 348/723 |
| 7,194,753 B1 * | 3/2007 | Fries et al. | 725/40 |
| 7,310,807 B2 * | 12/2007 | Pearson et al. | 725/78 |
| 7,324,168 B2 * | 1/2008 | Griesau et al. | 348/734 |
| 7,373,650 B1 * | 5/2008 | Rodriguez et al. | 725/40 |
| 7,380,264 B2 * | 5/2008 | Potrebic | 725/78 |
| 7,450,148 B2 * | 11/2008 | Kim et al. | 348/14.01 |
| 2003/0200548 A1 | 10/2003 | Baran et al. | |
| 2004/0068752 A1 * | 4/2004 | Parker | 725/120 |
| 2004/0068754 A1 * | 4/2004 | Russ | 725/131 |
| 2005/0076373 A1 * | 4/2005 | Jung | 725/74 |
| 2005/0166258 A1 * | 7/2005 | Vasilevsky et al. | 725/138 |
| 2005/0251827 A1 * | 11/2005 | Ellis et al. | 725/47 |

FOREIGN PATENT DOCUMENTS

| | | |
|---|---|---|
| DE | 29917439 | 2/2000 |
| JP | 2001-016669 | 1/2001 |
| JP | 2001-69488 | 3/2001 |
| JP | 2002-354450 | 12/2002 |
| JP | 2003-219200 | 7/2003 |
| KR | 2001/000453 | 1/2001 |
| KR | 2003/090953 | 12/2003 |
| WO | WO 01/17200 | 3/2001 |
| WO | WO 01/95097 | 12/2001 |
| WO | WO 02/11451 | 2/2002 |

OTHER PUBLICATIONS

Patent Abstracts of Japan, vol. 2000, No. 16, May 8, 2001 & JP 2001-016669 (Matsushita Electric Ind.Co.Ltd.).

Search Report Dated Oct. 31, 2005.

* cited by examiner

METHOD FOR CONTROLLING A MULTI-TUNER SIGNAL RECEIVING APPARATUS

CROSS REFERENCE TO RELATED APPLICATION

This application claims the benefit, under 35 U.S.C. §365 of International Application PCT/US2005/013801, filed Apr. 21, 2005, which was published in accordance with PCT Article 21(2) on Dec. 1, 2005 in English and which claims the benefit of U.S. provisional patent application No. 60/568,896, filed May 7, 2004.

BACKGROUND OF THE INVENTION

1. Field of the Invention

The present invention generally relates to an apparatus for enabling signal distribution in a household and/or business dwelling, and to a method for enabling effective user control of such an apparatus via one or more remote control devices.

2. Background Information

Today there are several different broadcast systems including satellite, cable, terrestrial and internet broadcast systems. In a satellite broadcast system, for example, a satellite receives signals representing audio, video, and/or data information from an earth-based transmitter. The satellite amplifies and rebroadcasts these signals to a plurality of receivers, located at the dwellings of consumers, via transponders operating at specified frequencies and having given bandwidths. Such a system includes an uplink transmitting portion (i.e., earth to satellite), an earth-orbiting satellite receiving and transmitting unit, and a downlink portion (i.e., satellite to earth) including one or more receivers located at the dwellings of consumers.

For dwellings which receive signals via systems such as a satellite broadcast system, the distribution of received signals in the dwelling can be a difficult proposition. For example, many existing dwellings are equipped with coaxial cable such as RG-59 type coaxial cable, which is not readily conducive for distributing certain signals such as satellite broadcast signals. One reason that coaxial cable such as RG-59 is not used to distribute certain signals in a dwelling is that the coaxial cable may use a portion of the frequency spectrum that is different than the frequencies occupied by the signals to be distributed. For example, signals such as satellite broadcast signals may occupy a portion of the frequency spectrum (e.g., greater than 1 GHz) which is higher than the signal frequencies that can be readily distributed over coaxial cable such as RG-59 and its associated signal splitters and/or repeaters (e.g., less than 860 MHz). Another reason coaxial cable such as RG-59 is not used to distribute such signals in a dwelling is that the coaxial cable may already be used for distributing cable or terrestrial broadcast signals. Accordingly, it may be difficult for signals such as satellite broadcast signals to co-exist with cable broadcast signals on the coaxial cable given its limited bandwidth.

Heretofore, the issue of distributing signals such as satellite, cable, terrestrial and internet broadcast signals in a dwelling has not been adequately addressed. Accordingly, there is a need for an apparatus for enabling signal distribution in a household and/or business dwelling, and for a method for enabling effective user control of such an apparatus via one or more remote control devices. The present invention addresses these and/or other issues.

SUMMARY OF THE INVENTION

In accordance with an aspect of the present invention, a multi-tuner signal receiving apparatus is disclosed. According to an exemplary embodiment, the apparatus comprises a plurality of tuners and control means including a memory for storing association data indicating an association between a remote control device and a first one of the tuners. The control means causes the first tuner to tune to a particular channel responsive to a control signal from the remote control device selecting the particular channel.

In accordance with another aspect of the present invention, a method for controlling an apparatus having a plurality of tuners is disclosed. According to an exemplary embodiment, the method comprises steps of storing association data indicating an association between a remote control device and a first one of the tuners, and causing the first tuner to tune to a particular channel responsive to a control signal from the remote control device selecting the particular channel.

In accordance with yet another aspect of the present invention, a television signal receiving apparatus is disclosed. According to an exemplary embodiment, the television signal receiving apparatus comprises a plurality of tuners and a controller including a memory operative to store association data indicating an association between a remote control device and a first one of the tuners. The controller causes the first tuner to tune to a particular channel responsive to a control signal from the remote control device selecting the particular channel.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
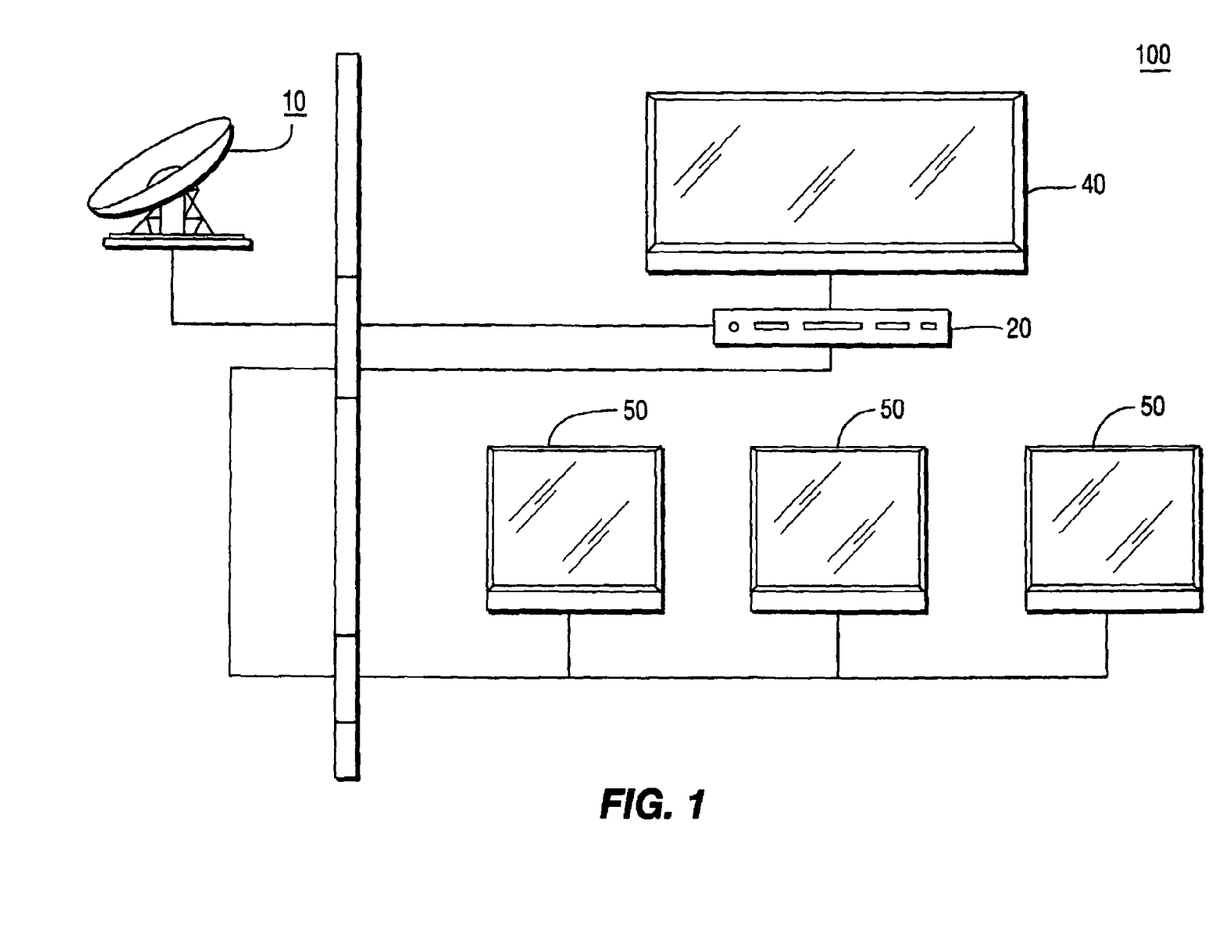
FIG. 1 is a diagram of an exemplary environment suitable for implementing the present invention.

Referring now to the drawings, and more particularly to FIG. 1, an exemplary environment 100 suitable for implementing the present invention is shown. In FIG. 1, environment 100 comprises a signal receiving element 10, a server apparatus 20 having a local client device 40, and other client devices 50. According to an exemplary embodiment, signal receiving element 10 is operatively coupled to server apparatus 20 via a transmission medium comprised of RG-6 type coaxial cable, and server apparatus 20 is operatively coupled to each client device 40 and 50 via a transmission medium comprised of RG-59 type coaxial cable. Other types of transmission media such as other types of coaxial cable, optical fibers, and/or air may also be used according to the present invention. Although not expressly shown in FIG. 1, environment 100 may also include elements such as signal splitters and/or repeaters. Environment 100 may for example represent a signal distribution network within a given household and/or business dwelling.

Signal receiving element 10 is operative to receive signals including audio, video, and/or data signals from one or more signal sources, such as satellite, terrestrial, cable and/or internet broadcast systems. According to an exemplary embodiment, signal receiving element 10 is embodied as an antenna such as a satellite receiving dish, but may also be embodied as any type of signal receiving element such as an input terminal and/or other element.

Server apparatus 20 is operative to receive signals including audio, video, and/or data signals from signal receiving element 10, process the received signals to generate processed analog signals, and distribute the processed analog signals to local client device 40 and/or client devices 50. Server apparatus 20 may also have data recording/storage capabilities. According to an exemplary embodiment, local client device 40 is operative to provide aural and/or visual outputs corresponding to processed analog signals provided from server apparatus 20, and may be embodied as an analog and/or digital device such as for example a standard-definition (SD) and/or high-definition (HD) television signal receiver. Also according to an exemplary embodiment, each client device 50 is operative to provide aural and/or visual outputs corresponding to processed analog signals provided from server apparatus 20, and may also be embodied as an analog and/or digital device such as for example a SD and/or HD television signal receiver.

Figure 2:
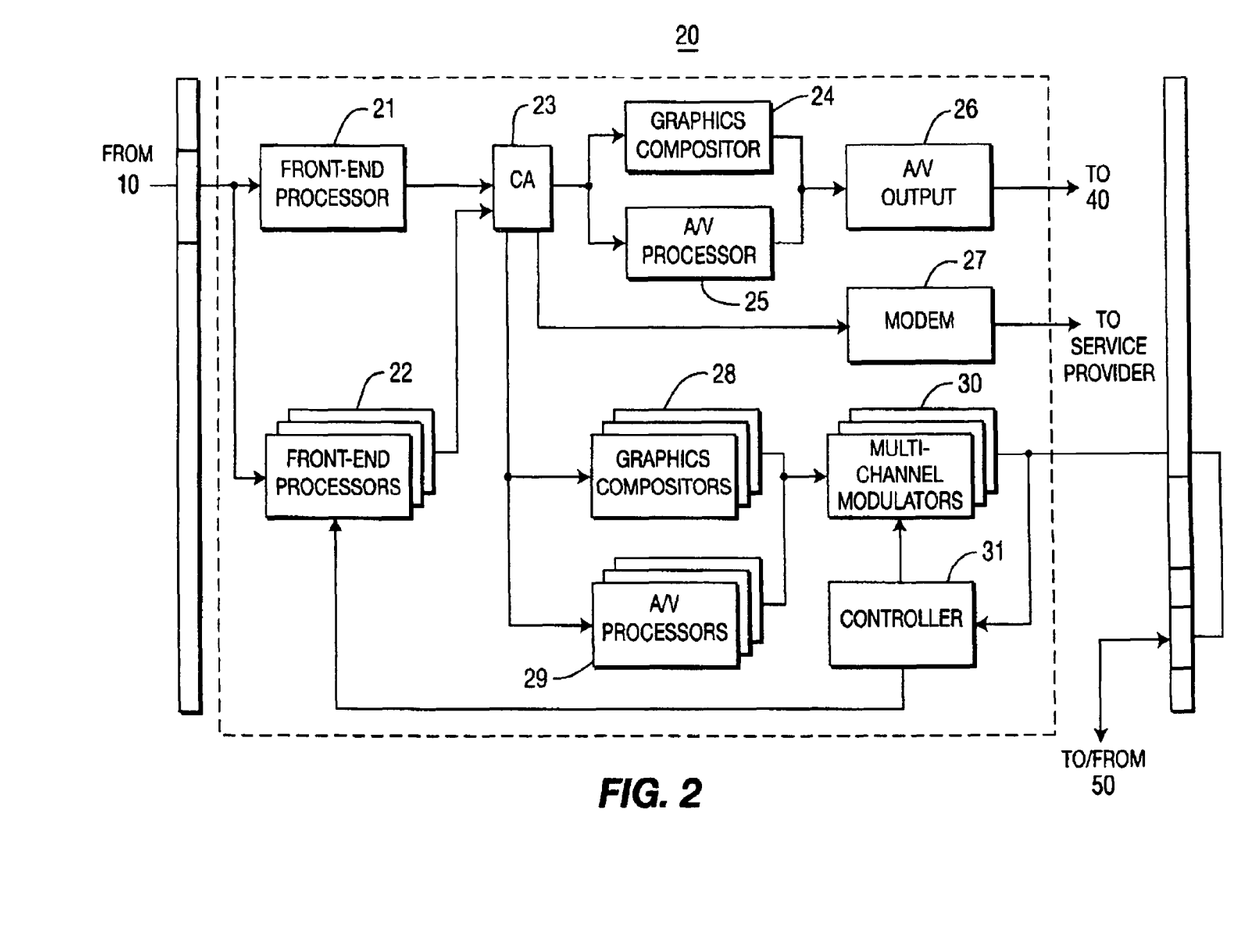
FIG. 2 is a block diagram of the server apparatus of FIG. 1 according to an exemplary embodiment of the present invention.

Referring to FIG. 2, a block diagram of server apparatus 20 of FIG. 1 according to an exemplary embodiment of the present invention is shown. In FIG. 2, server apparatus 20 comprises first front-end processing means such as front-end processor 21, second front-end processing means such as front-end processors 22, conditional access (CA) means such as CA module 23, first graphics compositing means such as graphics compositor 24, first audio/video (A/V) processing means such as A/V processor 25, A/V output means such as A/V output 26, modulating/demodulating means such as modem 27, second graphics compositing means such as graphics compositors 28, second A/V processing means such as A/V processors 29, modulating means such as multi-channel modulators 30, and control means such as controller 31. The foregoing elements of FIG. 2 may be embodied using integrated circuits (ICs), and any given element may for example be included on one or more ICs. For clarity of description, certain elements associated with server apparatus 20 such as an antenna and radio-frequency (RF) and/or, infrared (IR) receiving elements for respectively receiving RF and IR control signals from one or more remote control devices are not expressly shown in FIG. 2. Moreover, certain control signals, power signals and/or other elements may not be expressly shown in FIG. 2.

Front-end processor 21 is operative to perform various front-end processing functions of server apparatus 20 for local client device 40. According to an exemplary embodiment, front-end processor 21 is operative to perform processing functions including channel tuning, analog-to-digital (A/D) conversion, demodulation, forward error correction (FEC) decoding, and de-multiplexing functions. The channel tuning function of front-end processor 21 may for example be controlled by a control signal provided from a processor (not shown) responsive to a channel change command by a user (e.g., via remote control, etc.). According to an exemplary embodiment, the channel tuning functions of front-end processor 21 may convert satellite broadcast signals from a relatively high frequency band (e.g., greater than 1 GHz) to baseband signals. As referred to herein, the term "baseband" may refer to signals, which are at, or near, a baseband level. The tuned baseband signals are converted to digital signals, which are demodulated to generate demodulated digital signals. According to an exemplary embodiment, front-end processor 21 may be operative to demodulate various types of signals such as Quadrature Amplitude Modulated (QAM) signals, Phase Shift Keyed (PSK, e.g., QPSK) signals, and/or signals having other types of modulation. The FEC decoding function is applied to the demodulated digital signals to thereby generate error corrected digital signals. According to an exemplary embodiment, the FEC decoding function of front-end processor 21 may include Reed-Solomon (R-S) FEC, de-interleaving, Viterbi and/or other functions. The error corrected digital signals may include a plurality of time-division multiplexed broadcast programs, and are de-multiplexed into one or more digital transport streams.

Front-end processors 22 are operative to perform various front-end processing functions of server apparatus 20 for the signals distributed to client devices 50. According to an exemplary embodiment, front-end processors 22 are each operative to perform the same processing functions as front-end processor 21 including the channel tuning, AND conversion, demodulation, FEC decoding, and de-multiplexing functions previously described herein to thereby generate one or more digital transport streams. For purposes of example and explanation, server apparatus 20 of FIG. 2 includes three front-end processors 22 (i.e., one for each client device 50). In practice, however, the number of front-end processors 22 may be a matter of design choice. For example, the number of front-end processors 22 may vary depending upon the number of coaxially connected client devices 50 serviced by server apparatus 20. Accordingly, there may be "N" front-end processors 22 for "N" client devices 50, where "N" is an integer. There may also be more front-end processors 22 than client devices 50 in order to provide signals from more than one signal source (e.g., cable and satellite) to each client device 50.

CA module 23 is operative to perform a CA function of server apparatus 20 by decrypting the digital transport streams provided from front-end processors 21 and 22 to thereby generate decrypted digital transport streams. According to an exemplary embodiment, CA module 23 may include a smart card and/or other elements, which enable the CA function for signals provided, for example, from satellite and/or cable sources.

Graphics compositor 24 is operative to perform graphics compositing functions of server apparatus 20, which enable graphical displays via local client device 40. According to an exemplary embodiment, graphics compositor 24 generates analog and/or digital signals that represent graphical displays such as on-screen menus, which allow users of local client device 40 to interact with server apparatus 20.

A/V processor 25 is operative to perform various A/V processing functions of server apparatus 20, which enable aural and/or visual outputs via local client device 40. According to an exemplary embodiment, A/V processor 25 is operative to process the decrypted digital transport streams provided from CA module 23 by performing functions including Motion Picture Expert Group (MPEG) decoding, National Television Standards Committee (NTSC) or other type of encoding, and digital-to-analog (D/A) conversion functions to thereby generate analog baseband signals. In this manner, the decrypted digital transport stream provided from CA module 23 may be MPEG decoded to generate decoded signals. The decoded signals may then be encoded as NTSC signals or other types of signals (e.g., PAL, SECAM, VSB, OAM, etc.), and converted to analog signals. In the event local client device 40 is a digital device, such as a digital television signal receiver, the aforementioned encoding and/or D/A functions of AN processor 25 may be bypassed.

A/V output 26 is operative to perform an A/V output function of server apparatus 20 by enabling output of the analog and/or digital signals provided from graphics compositor 24 and/or A/V processor 25 to local client device 40. According to an exemplary embodiment, A/V output 26 may be embodied as any type of A/V output means such as any type of wired and/or wireless output terminal (e.g., digital video via HDMI).

Modem 27 is operative to provide signals representing information such as billing, pay-per-view, and/or other information to a service provider. According to an exemplary embodiment, modem 27 may be coupled to a transmission medium such as a telephone line, and may be programmed to provide such information to the service provider in accordance with a predetermined schedule (e.g., every other Tuesday at 2:00 am, etc.).

Graphics compositors 28 are operative to perform graphics compositing functions of server apparatus 20, which enable graphical displays via client devices 50. According to an exemplary embodiment, graphics compositors 28 are each operative to perform the same functions as graphics compositor 24 previously described herein. For purposes of example and explanation, server apparatus 20 of FIG. 2 includes three graphics compositors 28 (i.e., one for each client device 50). In practice, however, the number of graphics compositors 28 may be a matter of design choice. For example, the number of graphics compositors 28 may vary depending upon the number of coaxially connected client devices 50 serviced by server apparatus 20. Accordingly, there may be "N" graphics compositors 28 for "N" client devices 50, where "N" is an integer.

A/V processors 29 are operative to perform various A/V processing functions of server apparatus 20, which enable aural and/or visual outputs via client devices 50. According to an exemplary embodiment, A/V processors 29 are each operative to process the one or more decrypted digital transport streams provided from CA module 23 using the same functions as A/V processor 25, including the MPEG decoding, NTSC or other encoding, and D/A conversion functions previously described herein to thereby generate analog baseband signals. For purposes of example and explanation, server apparatus 20 of FIG. 2 includes three A/V processors 29 (i.e., one for each client device 50). In practice, however, the number of A/V processors 29 may be a matter of design choice. For example, the number of A/V processors 29 may vary depending upon the number of coaxially connected client devices 50 serviced by server apparatus 20. Accordingly, there may be "N" A/V processors 29 for "N" client devices 50, where "N" is an integer. There may also be more A/V processors 29 than client devices 50 in order to provide signals from more than one signal source (e.g., cable and satellite) to each client device 50.

Multi-channel modulators 30 are operative to modulate the analog signals provided from graphics compositors 28 and/or A/V processors 29 to thereby generate processed analog signals which may be provided to one or more client devices 50 via the transmission medium (e.g., coaxial cable, etc.) connecting server apparatus 20 and client devices 50. Each multi-channel modulator 30 may perform functions such as frequency upconversion, quadrature combining, filtering, and/or other functions. According to an exemplary embodiment, each multi-channel modulator 30 modulates the analog signals responsive to one or more control signals provided from controller 31. Such control signals cause multi-channel modulators 30 to modulate the analog signals to one or more available frequency bands on the transmission medium (e.g., coaxial cable, etc.) which may be used to provide the processed analog signals from server apparatus 20 to one or more client devices 50. According to an exemplary embodiment, each multi-channel modulator 30 modulates the analog signals to frequency bands, which are less than 1 GHz.

Controller 31 is operative to perform various control functions of server apparatus 20. According to an exemplary embodiment, controller 31 includes a non-volatile memory (not shown in FIG. 2) and enables a setup process that allows one or more remote control devices to control server apparatus 20. As part of this setup process, controller 31 stores association data in its memory indicating an association among a given remote control device, a given tuner (i.e., front-end processor 22) of server apparatus 20, and a channel (i.e., frequency band) on the transmission medium connecting server apparatus 20 and client devices 50. Controller 31 may store such association data for multiple remote control devices including remote control devices for client devices 50. As will be described later herein, controller 31 uses the aforementioned association data to enable effective user control of server apparatus 20 via such remote control devices. Controller 31 is also operative to perform various other functions, as will be described later herein. Although not expressly shown in FIG. 2, controller 31 is preferably coupled to the IR and RF receiving elements of server apparatus 20 for respectively receiving IR and RF control signals from remote control devices.

Also according to an exemplary embodiment, controller 31 is operative to detect one or more available frequency bands on the transmission medium (e.g., coaxial cable, etc.), which may be used to provide the processed analog signals from server apparatus 20 to one or more client devices 50. Based on this detection, controller 31 generates one or more control signals, which control multi-channel modulator 30, as previously described herein. Controller 31 may also generate one or more control signals which control other elements of server apparatus 20, including elements of front-end processors 21 and 22. For clarity of description, however, such control signals may not be expressly shown in FIG. 2.

According to an exemplary embodiment, controller 31 dynamically scans a plurality of frequency bands on the transmission medium (e.g., coaxial cable, etc.) to thereby detect the one or more available frequency bands. The controller 31 may detect an available frequency band by measuring the signal strength (e.g., power) in that frequency band. If the signal strength of a frequency band is below a threshold, indicating no signals are transmitting in that frequency band, controller 31 determines that the frequency band is available. According to another exemplary embodiment, controller 31 may detect the one or more available frequency bands on the transmission medium (e.g., coaxial cable, etc.) based on a user input. For example, a user may interact with server apparatus 20 via an on-screen menu provided via local client device 40 and/or client devices 50 which enables the user to select one or more frequency bands on the transmission medium (e.g., coaxial cable, etc.) to be used for signal transmission between server apparatus 20 and client devices 50. In this manner, the user may cause certain frequency bands on the transmission medium (e.g., coaxial cable, etc.) to be dedicated (i.e., "notched out") for signal transmission between server apparatus 20 and client devices 50. Accordingly, as referred to herein, the term "available frequency band" means, either a frequency band detected by controller 31 as having no signals transmitting, or a frequency band specified by a user.

Figure 3:
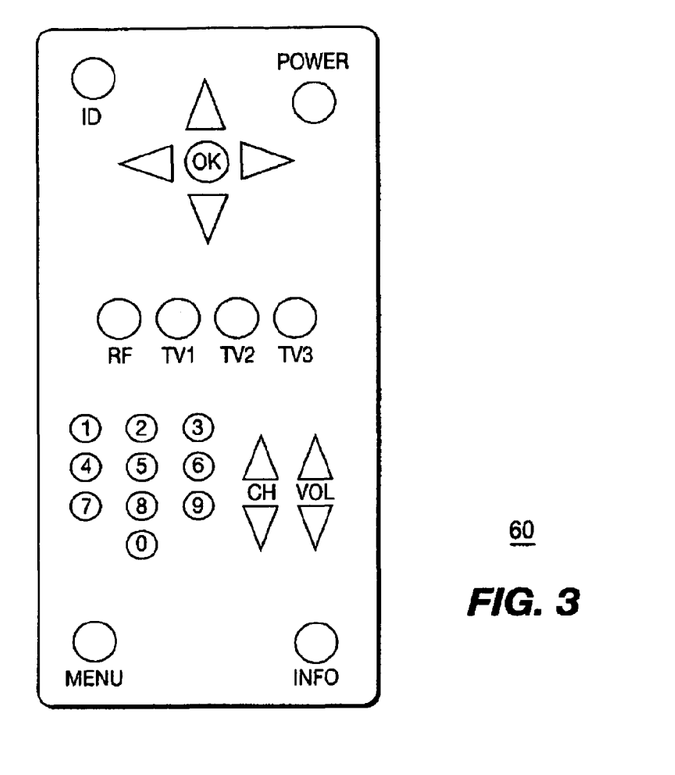
FIG. 3 is a remote control device according to an exemplary embodiment of the present invention.

Referring to FIG. 3, a remote control device 60 according to an exemplary embodiment of the present invention is shown. As shown in FIG. 3, remote control device 60 comprises an identification (ID) key, a power key, directional arrow keys (i.e., an up arrow key, a down arrow key, a right arrow key, and a left arrow key), an OK key, an RF key, three TV keys (i.e., TV1, TV2, TV3), number keys (i.e., 0-9), a channel up key, a channel down key, a volume up key, a volume down key, a menu key, and an information (INFO) key. Other keys may also be added for other functions, and some of the keys shown in FIG. 3 may not be necessary for certain embodiments. Although not expressly shown in FIG. 3, remote control device 60 also includes an IR transmitter for transmitting IR control signals, an RF transmitter for transmitting RF control signals, a memory for storing data, and a processor for performing various processing functions. As will described later herein, remote control device 60 can be programmed to control devices including server apparatus 20 and one or more client devices 50.

Figure 4:
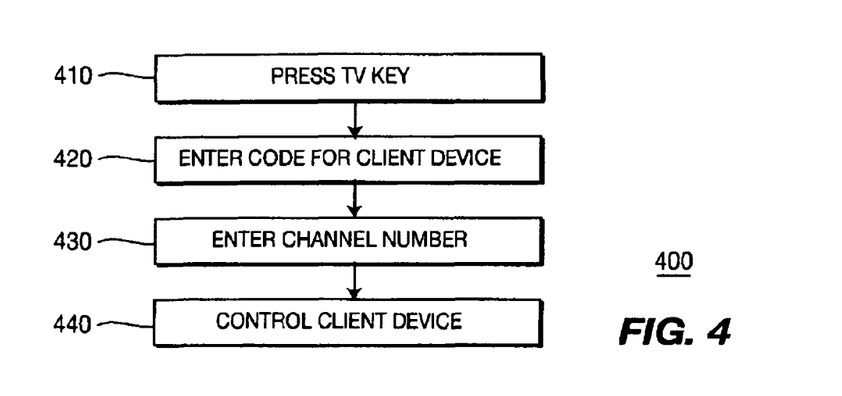
FIG. 4 is a flowchart illustrating exemplary steps according to one aspect of the present invention.

Referring to FIG. 4, a flowchart illustrating exemplary steps according to one aspect of the present invention is shown. In particular, FIG. 4 shows exemplary steps for programming a remote control device, such as remote control device 60 of FIG. 3, to control a client device, such as a particular client device 50 of FIG. 1. Accordingly, for purposes of example and explanation, the steps of FIG. 4 will be described with reference to one of the client devices 50 of FIG. 1 and remote control device 60 of FIG. 3. It is noted that the steps of FIG. 4 may be repeated so that a single remote control device 60 can control multiple client devices 50, and/or that multiple remote control devices 60 can control a single client device 50. The steps of FIG. 4 are exemplary only, and are not intended to limit the present invention in any manner. According to an exemplary embodiment, the control signals output from remote control device 60 in the steps of FIG. 4 are preferably IR signals, although RF signals could also be used.

At step 410, a user activates (e.g., by pressing) one of the TV keys of remote control device 60. According to an exemplary embodiment, the user presses one of the TV keys (i.e., TV1, TV2, TV3) of remote control device 60 to create an association between the pressed TV key (e.g., TV1) and a particular client device 50 that receives an IR control signal corresponding to the pressed TV key. As will be described later herein, the TV key pressed at step 410 may be later used to initiate control of the particular client device 50 associated with that TV key. According to another exemplary embodiment, instead of using multiple TV keys to create an association with a particular client device 50, the user may activate a single mode key of remote control device 60 (not shown in FIG. 3) to enter a TV mode, and then enter a number identifying the particular client device 50 to be controlled using the number keys. For example, the single mode key may be a key labeled with the word "TV." Accordingly, the user may press the TV key, and then press the number "3" key to create an association between those keys and a particular client device 50. As such, if a single digit is used, remote control device 60 may be programmed to control up to ten different client devices 50.

At step 420, the user enters a code corresponding to the model of the particular client device 50 via remote control device 60. According to an exemplary embodiment, step 420 may be performed in a manner that is similar to programming a universal remote control device. For example, the user may enter a number code included in a user manual for the particular client device 50 and/or remote control device 60.

At step 430, the user enters a channel number to be used by the particular client device 50 for receiving signals from server apparatus 20. According to an exemplary embodiment, the channel number entered at step 430 is stored by the particular client device 50 and remote control device 60, and client device 50 will automatically tune to the channel number indicated by the user's entry at step 430 when it is turned on. The user may, for example, be required to enter the channel number at step 430 within a predetermined time interval after the model code is entered at step 420. As known in the art, each channel number corresponds to a different frequency band on the transmission medium (e.g., coaxial cable, etc.) connecting server apparatus 20 and client devices 50. As such, the channel number entered at step 430 should preferably correspond to one of the available frequency bands determined by controller 31, as previously described herein. If the transmission medium is being used to provide signals to client devices 50 from, for example, both a cable operator and server apparatus 20, the channel entered at step 430 should be one that does not carry programs from the cable operator.

According to an exemplary embodiment, remote control device 60 stores only one channel number. As such, when remote control device 60 has already stored a channel number at step 430, a user does not have to enter another channel number when programming remote control for controlling another client device 50. If a user enters a new channel number after one has already been stored, the newly entered channel number will overwrite the existing one. Another way to enter a channel number at step 430 is to allocate a special key (not shown in FIG. 3) on remote control device 60, so that when this special key is pressed, the user should enter a channel number using the number keys within a predetermined time interval (e.g., three seconds, etc.). If the user does not enter a channel number at step 430, remote control device 60 may use a default channel number.

At step 440, the user can use remote control device 60 to control the particular client device 50. According to an exemplary embodiment, when remote control device 60 is in a TV mode and the power key is activated, remote control device 60 transmits an IR control signal to turn on the particular client device 50, and also transmits another IR control signal instructing the particular client device 50 to tune to the channel number entered at step 430. In this manner, client device 50 automatically tunes to the previously entered channel number, and the user does not have to separately enter the channel number after activating the power key. For example, after the user has programmed the TV1 key of remote control device 60 to control a particular client device 50 and entered channel number 96 in steps 410 to 430, when the user activates the TV1 key and the power key of remote control device 60, the particular client device 50 is turned on and automatically tuned to channel 96. After the particular client device 50 is turned on and tuned to the entered channel number, other keys of remote control device 60 can be used to control the particular client device 50. For example, the user may use the volume keys to adjust the volume, and the number keys and the channel up/down keys to tune to a particular channel for watching a program provided, for example, by a cable operator.

Figure 5:
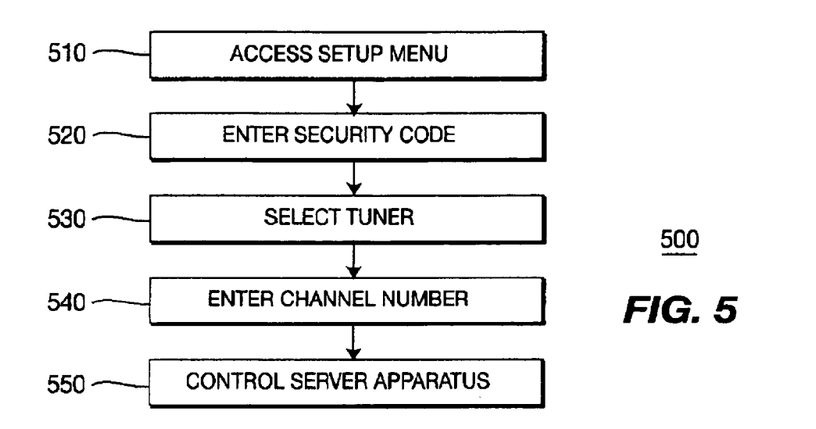
FIG. 5 is a flowchart illustrating exemplary steps according to another aspect of the present invention.

Referring to FIG. 5, a flowchart illustrating steps according to another aspect of the present invention is shown. In particular, FIG. 5 shows exemplary steps for programming a remote control device, such as remote control device 60 of FIG. 3, to control a multi-tuner signal receiving apparatus, such as server apparatus 20 of FIG. 2. Accordingly, for purposes of example and explanation, the steps of FIG. 5 will be described with reference to server apparatus 20 of FIG. 2 and remote control device 60 of FIG. 3. It is noted that the steps of FIG. 5 may be repeated for multiple remote control devices 60 so that multiple remote control devices 60 can control server apparatus 20. The steps of FIG. 5 are exemplary only, and are not intended to limit the present invention in any manner. According to an exemplary embodiment, the control signals output from remote control device 60 in the steps of FIG. 5 are preferably RF signals, although IR signals could also be used.

Figure 6:
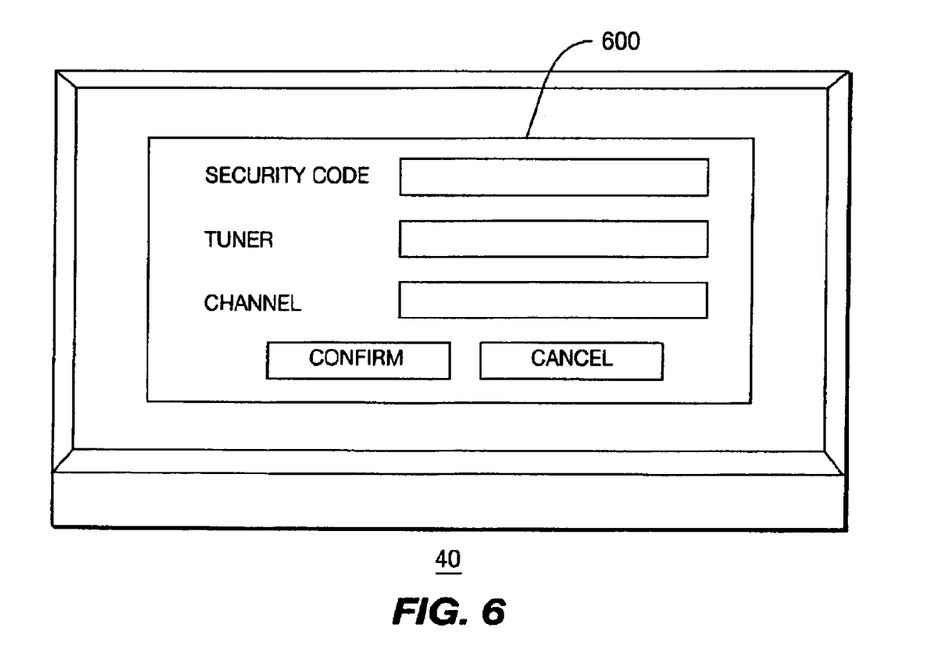
FIG. 6 is an on-screen menu according to an exemplary embodiment of the present invention.

At step 510, a user accesses a setup menu to facilitate a setup process that enables remote control device 60 to control server apparatus 20. According to an exemplary embodiment, the user may access the setup menu at step 510 via a main menu (not shown) displayed on local client device 40. According to an exemplary embodiment, the user may access the main menu by pressing the menu key of remote control device 60 which causes controller 31 of server apparatus 20 to provide a control signal instructing graphics compositor 24 to compose the main menu and display the main menu via local client device 40. From the main menu, the user may for example select the setup menu as a sub-menu option using the directional arrows keys and the OK key of remote control device 60. FIG. 6 shows an exemplary on-screen menu 600 that may be used for the setup process at step 510.

At step 520, the user enters a security code for remote control device 60. According to an exemplary embodiment, when the setup menu of FIG. 6 is displayed, the entry for entering a security code is highlighted. If the user activates the ID key on remote control device 60, the RF transmitter of remote control device 60 transmits a random security code in an RF signal. Controller 31 of server apparatus 20 receives the RF signal and stores the security code in its non-volatile memory (e.g., an EEPROM, etc.). Remote control device 60 also stores this security code in its own memory, and this security code is included in each control signal transmitted by remote control device 60 to server apparatus 20. In this manner, controller 31 of server apparatus 20 can identify the origin of a given control signal and retrieve the corresponding association data from its non-volatile memory, if necessary. Other methods of establishing synchronicity of control between remote control device 60 and server apparatus 20 can also be used.

At step 530, the user selects a particular tuner of server apparatus 20 to be controlled by remote control device 60. According to an exemplary embodiment, since server apparatus 20 includes a plurality of front-end processors 22 (each including a tuner), the user must inform server apparatus 20 as to which front-end processor 22 is to be used for tuning to a particular channel in response to a channel changing RF control signal originated from remote control device 60 being set up. In this manner, a particular front-end processor 22 and its tuner (or set of front-end processors 22 and tuners to accommodate signals from multiple signal sources) is associated with the particular remote control device 60 being setup. The association between a particular remote control device 60 and a front-end processor 22 and its tuner may be established so that a particular remote control device 60 is fixedly linked to a particular front-end processor 22 and tuner, or may be established dynamically by controller 31 so that a particular remote control device 60 and front-end processor 22 and tuner are associated temporarily. In this latter scenario, a particular remote control device 60 is virtually linked to a particular front-end processor 22 and tuner, and the association may dynamically change on a periodic basis.

According to an exemplary embodiment, to enter the associated tuner (i.e., front-end processor 22) at step 530, the user first activates the RF key of remote control device 60 and thereby puts remote control device 60 in an RF mode. The user then activates the down arrow key which causes remote control device 60 to transmit an RF signal that includes the security code previously stored at step 520. Controller 31 of server apparatus 20 receives the RF signal, and responds by providing a control signal that instructs graphics compositor 24 to highlight the tuner entry block of menu 600 (see FIG. 6). The user can then activate the right arrow key of remote control device 60 to display a list of available front-end processors 22 (not shown in FIG. 6). For example, if all three front-end processors 22 represented in FIG. 2 are available, controller 31 instructs graphics compositor 24 to display a list including numbers 1, 2, and 3 representing the three front-end processors 22, respectively. The user may then use the down arrow key to highlight one of the three numbers, and press the OK key to select the highlighted number. This causes controller 31 to store data in its non-volatile memory indicating that the selected front-end processor 22 and corresponding tuner is associated with remote control device 60 having the security code entered at step 520.

According to another exemplary embodiment, the user can simply enter a number identifying a particular front-end processor 22 and corresponding tuner at step 530. However, if the entered number has been used or is not available, controller 31 causes graphics compositor 24 to display an error message. At this point, the user can enter a different number or activate the CANCEL icon at the bottom of menu 600 to abort the setup process. Similarly, if the user does not enter a tuner (i.e., front-end processor 22) at step 530, controller 31 may automatically assign an available front-end processor 22 and corresponding tuner to remote control device 60, but should preferably display a warning message, so that the user has the option to agree with the assignment or enter a different one. However, if all front-end processors 22 have been previously assigned, controller 31 should display an error message, and the user should activate the CANCEL icon to abort the setup process and exit setup menu 600.

At step 540, the user enters a channel number to be used by server apparatus 20 for transmitting signals provided from the tuner (i.e., front-end processor 22) selected at step 530. According to an exemplary embodiment, server apparatus 20 is connected to client devices 50 via a transmission medium such as coaxial cable (e.g., RG-59, etc.). Accordingly, the channel number entered at step 540 corresponds to a particular frequency band on this transmission medium, and multi-channel modulator 30 modulates signals provided from the tuner selected at step 530 to this particular frequency band.

According to an exemplary embodiment, the user can highlight the channel entry block of menu 600 (see FIG. 6) and select a channel at step 540 in a manner similar to selecting a tuner at step 530. In particular, when the user presses the right arrow key of remote control device 60, a list of available channels (not shown) determined by controller 31 is displayed and the user can select a channel from the list. Alternatively, the user can select a channel at step 540 by simply entering a channel number using the number keys of remote control device 60. As long as the entered channel number is within a predefined range, controller 31 will allow the entry even if the entered channel is not in the list of available channels. Controller 31 may, however, warn the user that the entered channel is not available, so that the user has a chance to enter a different channel number. The entered channel number is then stored in the non-volatile memory of controller 31 as the channel number associated with the tuner selected at step 530 and remote control device 60 identified by the security code entered at step 520. When the user activates the CONFIRM icon of menu 600, the main menu is displayed, which can be removed by pressing the INFO key on remote control device 60. If a channel number is not entered at step 540, controller 31 assigns and stores a default channel number for remote control device 60.

It is important that the channel number entered at step 540 corresponds to the channel number stored in remote control device 60 at step 430 of FIG. 4. Otherwise, when a client device 50 is turned on using remote control device 60, the client device 50 will not receive signals from server apparatus 20 since the client device 50 automatically tunes to the channel stored in remote control device 60, not the channel stored in server apparatus 20. One way to reduce the chance of creating this inconsistency is to allocate a special key on remote control device 60. When this special key is activated at step 540, remote control device 60 transmits an RF signal including the channel number stored therein, so that controller 31 stores the same channel number in its non-volatile memory.

At step 550, the user may use remote control device 60 to control server apparatus 20. As discussed above, steps 510 to 540 create an association among a particular remote control device 60, a tuner (i.e., front-end processor 22) of server apparatus 20, and a channel on the transmission medium (e.g., coaxial cable, etc.) connecting server apparatus 20 and client devices 50. With this association, the particular remote control device 60 can instruct its associated tuner (i.e., front-end processor 22) of server apparatus 20 to tune to a particular channel and thereby receive audio, video, and/or data signals from one or more signal sources, such as satellite, terrestrial, cable and/or internet sources. The signals provided from the associated tuner of server apparatus 20 are then modulated to a frequency band corresponding to the associated channel and output onto the transmission medium so that any client device 50 tuning to that channel can receive the signals.

According to an exemplary embodiment, after an association has been established for a particular remote control device 60 pursuant to steps 510 to 540 of FIG. 5, a user can use that remote control device 60 to control server apparatus 20 by first activating the RF key, and then entering a channel number using the number keys thereby causing a channel changing RF control signal to be transmitted to server apparatus 20. Controller 31 of server apparatus 20 receives this RF control signal, retrieves the security code for the particular remote control device 60 from the RF control signal, retrieves the associated tuner (i.e., front-end processor 22) from non-volatile memory, and instructs the associated tuner to tune to the channel indicated by the RF control signal. To control a client device 50, the user simply activates a corresponding TV key on remote control device 60 as previously described herein.

Also according to an exemplary embodiment, after an association has been established for a particular remote control device 60 pursuant to steps 510 to 540 of FIG. 5, a user can access a menu (not shown) from the main menu of server apparatus 20 to see a list of remote control devices 60 and their associated tuners (i.e., front-end processors 22) and channels. The list should preferably include a DELETE icon for a user to delete any unwanted association, and a MODIFY icon for the user to change the tuner and channel associated with a particular remote control device 60.

According to an exemplary embodiment, if a first remote control device 60 has been programmed to control a first client device 50 and its association with server apparatus 20 has been created, the first remote control device 60 and the first client device 50 can be used to enter setup data for a second remote control device 60. To do this, a user uses the first remote control device 60 to bring up the main menu of server apparatus 20 by pressing the RF key and then the INFO key, which causes an RF control signal to be transmitted to server apparatus 20. When controller 31 receives the RF control signal, it instructs one of the graphics compositors 28 to provide the main menu for display on the first client device 50 via the transmission medium (e.g., coaxial cable, etc.). Once the main menu is displayed on the first client device 50, the user can use the down arrow key and the OK key of the first remote control device 60 to select the setup menu from the main menu. At this point, the second remote control device 60 must be used to enter the security code. After the security code has been entered, the associated tuner and channel number can be entered using either the first or second remote control devices 60.

To facilitate an even better understanding of the present invention and its attendant advantages and benefits, an example will now be provided. In this example, assume that remote control devices A and B are programmed to control client devices A and B, respectively, and thereby cause client devices A and B to automatically tune to channels A and B upon activating the respective power keys. Assume also that server apparatus 20 associates remote control devices A and B with tuners (i.e., front-end processors 22) A and B, and channels A and B, respectively. Assume further that client devices A and B are respectively a JVC TV and a Zenith TV, which are respectively located in rooms A and B. Now assume that user A wants to watch the JVC TV in room A using remote control device A. User A first turns on the JVC TV using remote control device A, which causes the JVC TV to automatically tune to channel A. User A then activates the RF key of remote control device A and enters a channel number causing server apparatus 20 to instruct tuner A to tune to an HBO channel. In the meantime, user B using remote control device B is watching an HGTV channel (using channel B) in room B. Further assume that remote control device A is also programmed to control the Zenith TV in room B using the TV2 key, and that user A then goes to room B telling user B that the current program on the HBO channel is worth watching. To show user B the HBO program, user A presses the TV2 key of remote control device A, and turns the Zenith TV off and on by pressing the power key of remote control device A. The Zenith TV automatically tunes to channel A, thereby displaying the HBO program. As such, a given remote control device can control multiple TVs in different rooms of a building, sharing a multi-tuner signal receiving apparatus.

Since server apparatus 20 should be able to effectively receive RF control signals from all of the remote control devices 60 for client devices 50 located in different rooms, an antenna for server apparatus 20 should be placed in a location where it can receive such RF control signals at a proper signal level. According to an exemplary embodiment, in order to assist an installer in placing the antenna, server apparatus 20 provides an RF signal strength menu to visually and/or aurally indicate the level of such RF control signals. An installer may, for example, access the RF signal strength menu from the main menu displayed on local client device 40 by activating the INFO key on the remote control device 60 for local client device 40, using the down arrow key to highlight or move a cursor to the RF signal strength menu selection, and then using the OK key to select the RF signal monitor menu. The installer can then use remote control device 60 to select which type of indication the installer desires (e.g., audio, video, both). At this point, controller 31 of server apparatus 20 is ready to receive a test signal from a remote control device 60 being tested, which is one of the remote control devices 60 for controlling a client device 50.

When the installer presses a test key (not shown in FIG. 3) on remote control device 60, controller 31 measures the RF signal strength and causes an output via local client device 40 indicating the strength level of the RF signal, either aurally, visually, or both as selected by the installer. If server apparatus 20 does not receive an RF signal within a predetermined time period after the installer has selected the type of indication, controller 31 causes an output via local client device 40 indicating that an RF signal has not received using the type of indication as selected by the installer. If the received RF signal is insufficiently strong, or is not received by server apparatus 20, the installer should adjust the position of the antenna to a point where server apparatus 20 can receive RF signals from all remote control devices 60. If the installer wants to retest the RF signal provided from a particular remote control device 60, or to test another remote control device 60, the installer may select a RETEST icon on the RF signal strength menu. Otherwise, if the installer has finished all the tests, the installer may exit the RF signal strength menu.

To assure that the RF control signals can be received under different situations, the installer may insert a fixed (e.g., 3-decibel (dB)) attenuator in the path between the antenna of server apparatus 20 and the remote control devices 60 during the test and remove the attenuator after the test, so that there is a 3-dB allowance for the remote control devices 60. In another exemplary embodiment, the test signal is a known pseudo random number sequence, and server apparatus 20 can indicate the signal strength by using the bit error rate. Also, as with the previously described setup process for remote control devices 60, if a remote control device 60 has been programmed to control a client device 50, the aforementioned RF signal strength menu of server apparatus 20 can be accessed via the client device 50 using the programmed remote control device 60 to test the signal strength of other remote control devices 60.

As described herein, the present invention provides an apparatus for enabling signal distribution in a household and/or business dwelling, and a method for enabling effective user control of such an apparatus via one or more remote control devices. The present invention may be applicable to various apparatuses, either with or without an integrated display device. Accordingly, the present invention may be applicable to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus operative to provide signals to a plurality of client devices via a transmission medium having a plurality of frequency bands, said apparatus comprising:
   a plurality of tuners;
   control means including a memory for storing association data indicating user designated associations between a plurality of remote control devices and said plurality of tuners and further indicating user designated associations between said plurality of remote control devices and said plurality of frequency bands; and
   wherein said control means causes a first one of said tuners to tune to a particular channel responsive to a control signal from a first one of said remote control devices associated with said first tuner selecting said particular channel.

2. The apparatus of claim 1, wherein said user designated associations between said plurality of remote control devices and said plurality of tuners are made by said user independently from said user designated associations between said plurality of remote control devices and said plurality of frequency bands.

3. The apparatus of claim 1, wherein said control means further causes data from said particular channel to be output to a first one of said frequency bands associated with said first remote control device responsive to said control signal.

4. The apparatus of claim 1, further comprising modulating means for generating modulated signals by modulating signals provided from said first tuner to a first one of said frequency bands associated with said first remote control device, and wherein said modulated signals are output to said transmission medium.

5. The apparatus of claim 4, wherein:
   said association data includes a first code associated with said first remote control device;
   said first remote control device provides said first code with each control signal output there from; and
   said control means uses said first code to distinguish said first remote control device from other said remote control devices.

6. The apparatus of claim 4, further comprising a graphics compositor for enabling display of a menu, and wherein a user can create said user designated associations between said remote control devices and said tuners and said user designated associations between said remote control devices and said frequency bands using said menu.

7. The apparatus of claim 6, wherein said menu provides a list of said plurality of tuners and said user designates said first tuner to be associated with said first remote control device from said list.

8. The apparatus of claim 2, wherein each of said remote control devices is also associated with one of said client devices.

9. The apparatus of claim 6, wherein:
   said control means detects available frequency bands on said transmission medium from among said plurality of frequency bands;
   said menu provides a list of said available frequency bands; and
   said user designates said first frequency band to be associated with said first remote control device from said list.

10. The apparatus of claim 9, wherein said control means allows said user to select a frequency band not included in said list.

11. The apparatus of claim 1, wherein said tuners receive broadcast signals from at least one signal source including at least one of a satellite source, a terrestrial source, a cable source, and an internet source.

12. A method for controlling an apparatus having a plurality of tuners, said apparatus being operatively coupled to a plurality of client devices via a transmission medium having a plurality of frequency bands, said method comprising steps of:
   storing association data indicating user designated associations between a plurality of remote control devices and said plurality of tuners and further indicating user designated associations between said plurality of remote control devices and said plurality of frequency bands; and
   causing a first one of said tuners to tune to a particular channel responsive to a control signal from a first one of said remote control devices associated with said first tuner selecting said particular channel.

13. The method of claim 12, wherein said user designated associations between said plurality of remote control devices and said plurality of tuners are made by said user independently from said user designated associations between said plurality of remote control devices and said plurality of frequency bands.

14. The method of claim 12, further comprising a step of causing data from said particular channel to be output to a first one of said frequency bands associated with said first remote control device responsive to said control signal.

15. The method of claim 12, further comprising steps of:
   generating modulated signals by modulating signals provided from said first tuner to a first one of said frequency bands associated with said first remote control device; and
   outputting said modulated signals to said transmission medium.

16. The method of claim 15, wherein:
   said association data includes a first code associated with said first remote control device;
   said first remote control device provides said first code with each control signal output there from; and
   said apparatus uses said first code to distinguish said first remote control device from other said remote control devices.

17. The method of claim 15, further comprising steps of:
   enabling display of a menu; and
   enabling a user to create said user designated associations between said remote control devices and said tuners and said user designated associations between said remote control devices and said frequency bands using said menu.

18. The method of claim 17, wherein said menu provides a list of said plurality of tuners and said user designates said first tuner to be associated with said first remote control device from said list.

19. The method of claim 13, wherein each of said remote control devices is also associated with one of said client devices.

20. The method of claim 17, further comprising a step of:
   detecting available frequency bands on said transmission medium from among said plurality of frequency bands; and
   wherein said menu provides a list of said available frequency bands and said user designates said first frequency band to be associated with said first remote control device from said list.

21. The method of claim 20, wherein said apparatus allows said user to select a frequency band not included in said list.

22. The method of claim 12, wherein said tuners receive broadcast signals from at least one signal source including at least one of a satellite source, a terrestrial source, a cable source, and an internet source.

23. A television signal receiving apparatus operative to provide signals to a plurality of client devices via a transmission medium having a plurality of frequency bands, said television signal receiving apparatus comprising:
   a plurality of tuners;
   a controller including a memory operative to store association data indicating user designated associations between a plurality of remote control devices and said plurality of tuners and further indicating user designated associations between said plurality of remote control devices and said plurality of frequency bands; and
   wherein said controller causes a first one of said tuners to tune to a particular channel responsive to a control signal from a first one of said remote control devices associated with said first tuner selecting said particular channel.

24. The television signal receiving apparatus of claim 23, wherein said user designated associations between said plurality of remote control devices and said plurality of tuners are made by said user independently from said user designated associations between said plurality of remote control devices and said plurality of frequency bands.

25. The television signal receiving apparatus of claim 23, wherein said controller further causes data from said particular channel to be output to a first one of said frequency bands associated with said first remote control device responsive to said control signal.

26. The television signal receiving apparatus of claim 23, further comprising a multi-channel modulator operative to generate modulated signals by modulating signals provided from said first tuner to a first one of said frequency bands associated with said first remote control device, and wherein said modulated signals are output to said transmission medium.

27. The television signal receiving apparatus of claim 26, wherein:
   said association data includes a first code associated with said first remote control device;
   said first remote control device provides said first code with each control signal output there from; and
   said control means uses said first code to distinguish said first remote control device from other said remote control devices.

28. The television signal receiving apparatus of claim 26, further comprising a graphics compositor operative to enable display of a menu, and wherein a user can create said user designated associations between said remote control devices and said tuners and said user designated associations between said remote control devices and said frequency bands using said menu.

29. The television signal receiving apparatus of claim 28, wherein said menu provides a list of said plurality of tuners and said user designates said first tuner to be associated with said first remote control device from said list.

30. The television signal receiving apparatus of claim 24, wherein each of said remote control devices is also associated with one of said client devices.

31. The television signal receiving apparatus of claim 28, wherein:
   said controller is further operative to detect available frequency bands on said transmission medium from among said plurality of frequency bands;

said menu provides a list of said available frequency bands; and said user designates said first frequency band to be associated with said first remote control device from said list.

32. The television signal receiving apparatus of claim 31, wherein said controller allows said user to select a frequency band not included in said list.

33. The television signal receiving apparatus of claim 23, wherein said tuners receive broadcast signals from at least one signal source including at least one of a satellite source, a terrestrial source, a cable source, and an internet source.

34. The television signal receiving apparatus of claim 23, wherein said controller is further operative to measure signal strengths of signals output from said remote control devices and enable outputs indicating said measured signal strengths.

* * * * *